United States Patent Office 3,684,505
Patented Aug. 15, 1972

3,684,505
METHINE DYE SENSITIZATION OF A DIHYDROQUINOLINE PHOTOCONDUCTOR
Johannes Josephus Vanheertum, Ottersdreef 13, Halle-Zandhoven, Belgium; Theofiel Hubert Ghys, Beukendreef 20, Kontich, Belgium; and Henri Depoorter, Hof van Rietlaan 39, Mortsel, Belgium
No Drawing. Filed Mar. 27, 1970, Ser. No. 23,482
Claims priority, application Great Britain, Mar. 28, 1969, 16,345/69
Int. Cl. G03g 5/00; G03c 1/00
U.S. Cl. 96—1.6                               15 Claims

ABSTRACT OF THE DISCLOSURE

An organic photoconductive polymer containing recurring nuclei of a dimethyl, dihydroquinoline is spectrally sensitized to the visible region of the spectrum by a methine dye containing at least one indole nucleus.

---

The present invention relates to the spectral sensitization of electrophotographic material. In particular it relates to electrophotographic material which comprises as photoconductor a photoconductive polymeric compound as described and claimed in U.S. patent application Ser. No. 793,881, now U.S. Pat. No. 3,620,742, and which shows an improved spectral sensitivity.

The above U.S. patent application relates to electrophotographic material comprising as photoconductor a photoconductive polymeric compounds, which includes homopolymers as well as copolymers, having recurring units corresponding to the following general formula:

$$\left[ \begin{array}{c} CH_3 \; H \\ | \quad | \\ -C-C- \\ \diagup \quad \diagdown \\ C \quad \quad C-CH_3 \\ | \quad \quad \quad | \quad \diagdown \\ C\text{---}N \quad CH_3 \\ \diagdown_{Z} \diagup \quad | \\ \quad \quad R \end{array} \right]$$

wherein:

R stands for hydrogen or a group that can be introduced into a secondary amine by reaction therewith of a compound containing R, such as a saturated or unsaturated, substituted or unsubstituted aliphatic or cycloaliphatic group, e.g. an alkyl group including a substituted alkyl group, an aralkyl group e.g. a benzyl group or a phenyl ethyl group, an allyl group, a cycloalkyl group e.g. a cyclohexyl group, an acyl group including a substituted acyl group, a carbamoyl group including a substituted carbamoyl group, an alkoxycarbonyl group, including a substituted alkoxycarbonyl group or a thiocarbamoyl group including a substituted thiocarbamoyl group, and Z stands for the atoms necessary to complete an aromatic nucleus including a substituted aromatic nucleus e.g. substituted with nitro or alkoxy.

The inherent spectral sensitivity of the photoconductive polymers used in the above application is mainly situated in the near U.V. light range, i.e. in the range of 360 nm. to 420 nm. with a maximum near 380 nm.

It has now been found that the spectral sensitivity of photoconductive recording material according to the above application can be favourably extended to the visible part of the spectrum by the use of methine dyes comprising an indole nucleus and corresponding to one of the following general Formulae I and II.

I.

$$R_1\text{---}N=(CH\text{---}CH=)_{n-1}C\text{---}A_1 \left[ \begin{array}{c} R_3 \quad R_4 \\ | \quad \; \\ N \\ | \\ R_2 \quad \quad \quad R_5 \\ \quad \quad \quad \quad \quad R_6 \end{array} \right] X_1^-$$

wherein:

$A_1$ stands for dimethine or tetramethine including substituted dimethine and tetramethine, $n$ stands for 1 or 2, $R_1$ stands for alkyl including substituted alkyl, an unsaturated aliphatic group e.g. allyl, aralkyl including substituted aralkyl, aryl including substituted aryl or cycloalkyl, $R_2$ stands for alkyl, aryl including substituted aryl e.g. phenyl and phenyl substituted preferably in the p-position by alkyl, halogen and alkoxy, a 5- or 6-membered heterocycle the heteroatom of which is oxygen, sulphur, selenium or nitrogen such as 2-, 3- or 4-pyridyl, 2-furyl, 2-thienyl, etc. including their quaternary salts, $R_3$ stands for hydrogen or has one of the meanings given for $R_1$, $R_4$ stands for hydrogen, alkyl, alkoxy or halogen or together with $R_3$ forms an alkylene bridge such as dimethylene and trimethylene, or together with $R_5$ represents the atoms necessary to complete a fused-on benzene nucleus, each of $R_5$ and $R_6$ (the same or different) stands for hydrogen, alkyl, alkoxy or halogen or together represent the atoms necessary to complete a fused-on benzene nucleus;

$X_1^-$ represents an anion e.g. $Cl^-$, $Br^-$, $I^-$, $ClO_4^-$, $CH_3SO_4^-$, and $$H_3C\text{---}\langle \text{---} \rangle\text{---}SO_3^-$$

$Z_1$ represents the atoms necessary to complete a heterocyclic nucleus of the types used in the production of cyanine dyes e.g. such as those of the thiazole series, e.g. thiazole, 4-methylthiazole, 4-phenylthiazole, 5-methylthiazole, 5-phenylthiazole, 4,5-dimethylthiazole, 4,5-diphenylthiazole, 4-(2-thienyl)-thiazole, those of the benzothiazole series e.g. benzothiazole, 5-chlorobenzothiazole, 5-methylbenzothiazole, 6-methylbenzothiazole, 5,6-dimethylbenzothiazole, 5-bromobenzothiazole, 5-phenylbenzothiazole, 5-methoxybenzothiazole, 6 - methoxybenzothiazole, 4,5,6,7 - tetrahydrobenzothiazole, 5,6-dimethoxybenzothiazole, 5,6-dioxymethylenebenzothiazole, 5-hydroxybenzothiazole, 6 - hydroxybenzothiazole, those of the naphthothiazole series e.g. naphtho[2,1 - d]thiazole, naphtho[1,2 - d]thiazole, 5-methoxynaphtho[1,2-d]thiazole, 5-ethoxynaphtho[1,2-d]thiazole, 8 - methoxynaphthol[2,1-d]thiazole, 7 - methoxynaphtho[2,1-d]thiazole, those of the thionaphtheno[7,6-d]thiazole series e.g. 7-methoxythionaphtheno[7,6-d]thiazole, those of the oxazole series e.g. 4-methyloxazole, 5-methyloxazole, 4-phenyloxazole, 4,5-diphenyloxazole, 4-ethyloxazole, 4,5-dimethyloxazole, 5-phenyloxazole, those of the benzoxazole series e.g. benzoxazole, 5 - chlorobenzoxazole, 5 - methylbenzoxazole, 5-phenylbenzoxazole, 6-methylbenzoxazole, 5,6-dimethylbenzoxazole, 5 - methoxybenzoxazole, 6 - methoxybenzoxazole, 5-hydroxybenzoxazole, 6-hydroxybenzoxazole, those of the naphthoxazole series, e.g. naphtho[2,1-d]oxazole, naphtho[1,2-d]oxazole, those of the selenazole series e.g. 4-methylselenazole, 4-phenylselenazole, those of the benzoselenazole series e.g. benzoselenazole, 5-chlorobenzoselenazole, 5-methylbenzoselenazole, 5,6 - dimethylbenzoselenazole, 5-methoxybenzoselenazole, 5-methyl - 6 - methoxybenzoselenazole, 5,6-dioxymethylenebenzoselenazole, 5-hydroxybenzoselenazole, 4,5,6,7 - tetrahydrobenzoselenazole, those of the naphthoselenazole series e.g. naphtho[2,1-d]selenazole, naphtho[1,2-d]selenazole, those of the thiazoline series e.g. thiazoline, 4-methylthiazoline, 4-hydroxymethyl-4-methylthiazoline, 4,6-bis-hydroxymethylthiazoline, those of the oxazoline series e.g.

oxazoline, those of the selenazoline series e.g. selenazoline, those of the 2-quinoline series e.g. quinoline, 6-methylquinoline, 6-chloroquinoline, 6-methoxyquinoline, 6-ethoxyquinoline, 6-hydroxyquinoline, those of the 4-quinoline series e.g. quinoline, 6-methoxyquinoline, 7-methylquinoline, 8-methylquinoline, those of the 1-isoquinoline series, e.g. isoquinoline, 3,4-dihydroisoquinoline, those of the 3-isoquinoline series e.g. isoquinoline, those of the 2-pyridine series e.g. pyridine, 5-methylpyridine, those of the 3,3-dialkylindolenine series e.g. 3,3-dimethylindolenine, 3,3-dimethyl-5-chloroindolenine, 3,3,5 - trimethylindolenine, 3,3,7 - trimethylindolenine, those of the benzimidazole series e.g. benzimidazole, 5,6-dichlorobenzimidazole, 5-chlorobenzimidazole, 5,6-dibromobenzimidazole, 5-phenylbenzimidazole, 5 - fluorobenzimidazole, 5,6 - difluorobenzimidazole, 5-cyanobenzimidazole, 5,6 - dicyanobenzimidazole, 5 - chloro - 6 - cyanobenzimidazole, 5-fluoro-6-cyanobenzimidazole, 5-acetylbenzimidazole, 5-carboxybenzimidazole, 5-carbethoxybenzimidazole, 5-sulphamylbenzimidazole, 5-N-ethylsulphanylbenzimidazole, 5-ethylsulphonylbenzimidazole and 5-trifluoromethylsulphonylbenzimidazole, II. 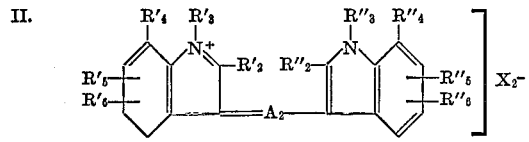

wherein:

$A_2$ stands for monomethine or trimethine including substituted monomethine or trimethine, each of $R'_2$-$R'_6$ and $R''_2$-$R''_6$ (the same or different) have one of the meanings given for $R_2$-$R_6$, $X_2^-$ has the same significance as $X_1^-$, The following is a non-limitative list of representative sensitizing dyes of use according to the present invention:

Dyes corresponding to general Formula I:

1.

2.

3.

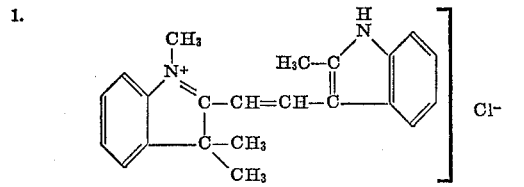

4.

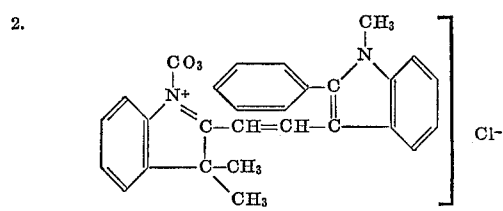

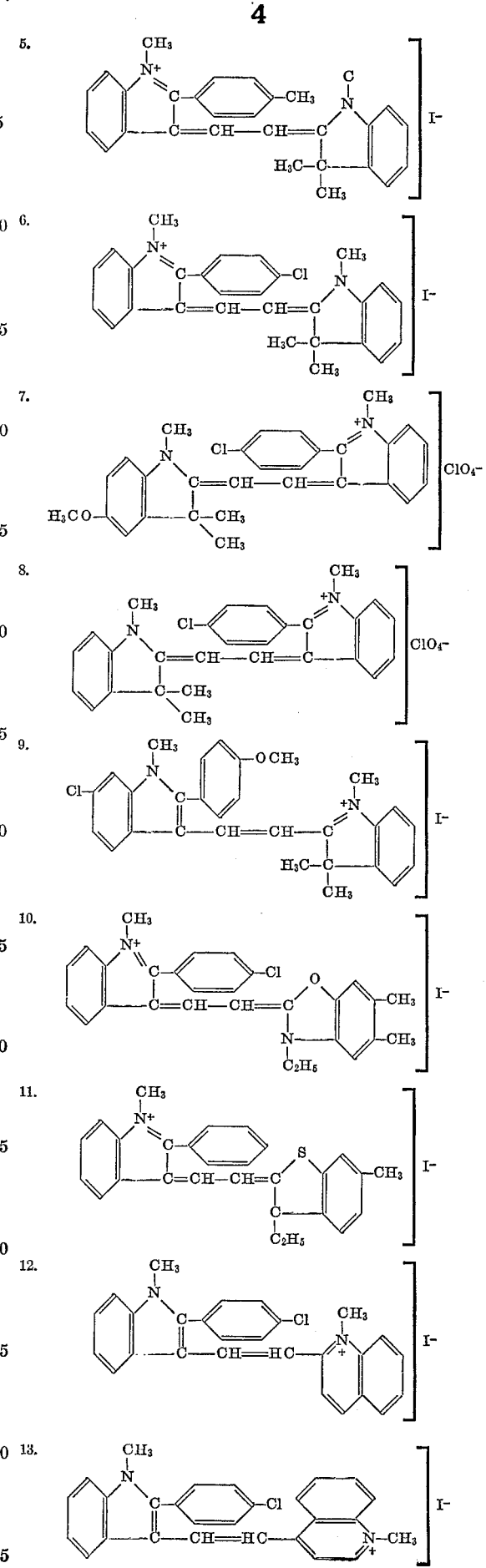

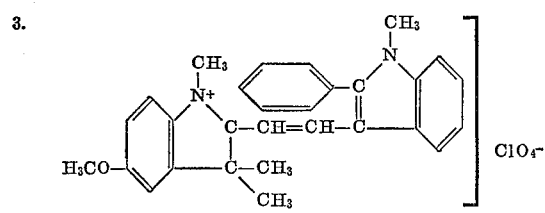

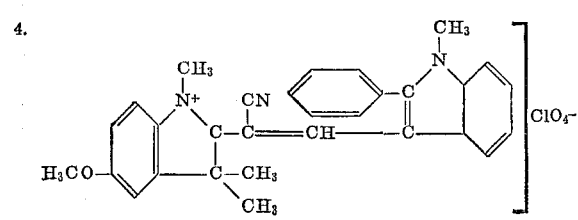

Dyes corresponding to general Formula II:

14. 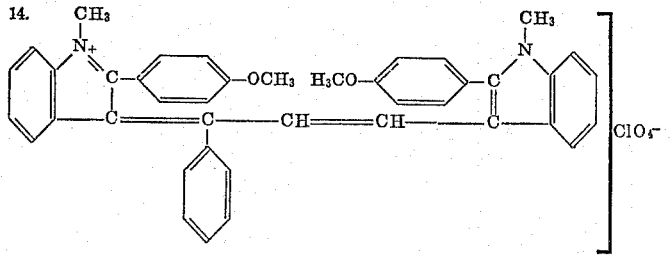

15. 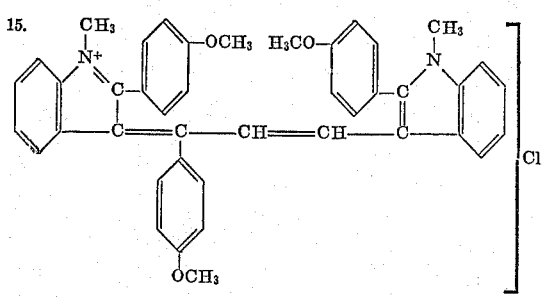

16. 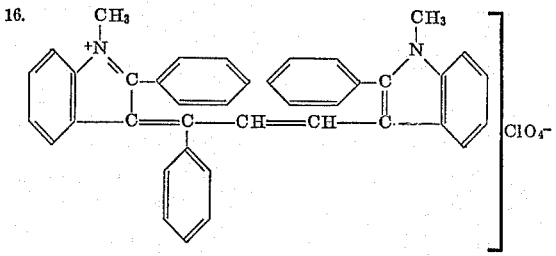

17. 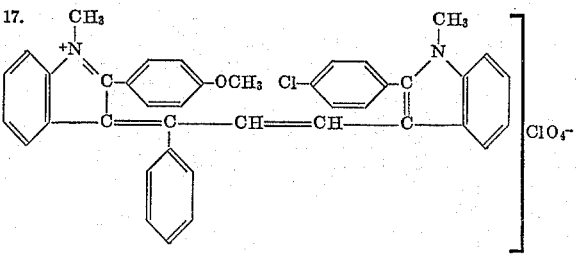

18. 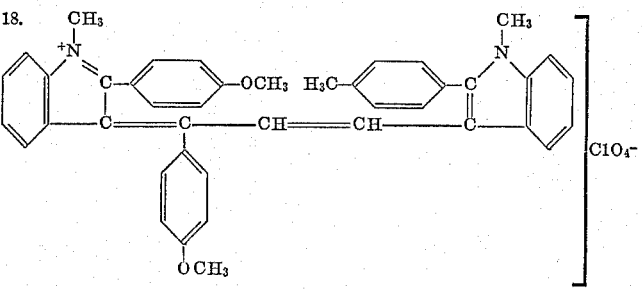

19. 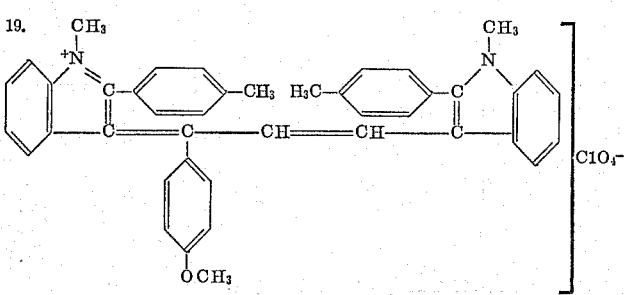

20. 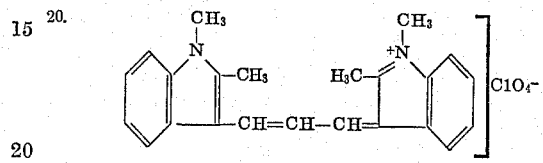

21. 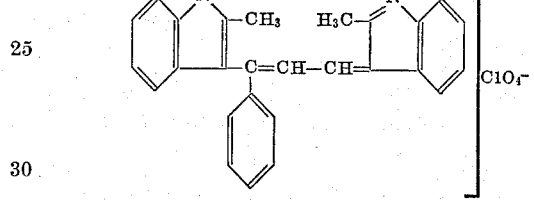

The dyestuffs corresponding to the above formulae can be prepared according to the methods known by those skilled in the art of methine dye chemistry.

The photoconductive recording layers comprising spectral sensitizing dyes of use according to the invention may contain in addition to the polymeric photoconductive compound having recurring units as described above, spectral sensitizers of any other type, other inorganic or organic photoconductors, photoconductive or non-photoconductive polymeric binding or curing agents and substances imparting desired chemical or physical properties to the recording element which are either or not photoconductive and which exert an influence e.g. on the dark-resistivity, the dischargeability or conductivity of the recording layer or on the transparency or the quality of the final image, etc. Common additives well known in the art of preparing coatings for recording purposes may also be used, e.g. matting agents, fluorescing compounds, phosphors, optical brightening agents, agents controlling the adhesive power of the recording layer, agents controlling the elasticity, the plasticity and the hardness of the recording layer, agents controlling the viscosity of the coating composition, anti-oxidants, gloss-improving agents, etc.

For more details as regards the polymeric photoconductor having recurring units as described above and all of the desirable and possible substances for use in addition to the said photoconductor there can be referred to U.S. patent application Ser. No. 793,881 which should be read in conjunction herewith.

Particularly useful compounds for use in combination with the polymeric photoconductive substances spectrally sensitized according to the present invention are particles inhibiting or decreasing the fringe effect, which occurs when large electrostatically charged areas are developed and is characterized by the deposit of electrostatically charged substances only at the edges of said areas. These particles are for instances inorganic pigment particles and organic water-insoluble particles, which are incorporated into the continuous polymeric phase of the recording layer.

Especially suitable for that purpose are zinc oxide pigment particles and a finely divided mineral product (average particle size: $5\mu$) known as Microdol (trade name of A.S. Norwegian Tale, Bergen, Norway, for a mixture having the following composition (percent by weight):

| | Percent |
|---|---|
| $MgCO_3$ | 45.15 |
| $Fe_2O_3$ | 0.04 |
| $Al_2O_3$ | 0.03 | and Dry-Flo (trade name of National Starch and Chemical Corporation, Plainsfield, N.J., U.S.A., for a starch ester containing hydrophobic groups).

These particles size between 1 and $5\mu$ and are preferably used in an amount of 2.4 to 24% by weight in respect of the polymeric material contained in the recording layer. Optical results are obtained with an amount of 6% by weight.

As noted in the above U.S. patent application, it is necessary in particular cases, e.g. when the molecular weight of the photoconductive polymers is not very high, in other words when the amount of recurring units is below 10, to use these polymers together with an optionally photoconductive binding agent or curing agent in order to form a recording layer of sufficient mechanical strength. A proper combination with selected binding agents and/or curing agents may result in an enhancement of the total sensitivity so that the binder or curing agent applied may be considered as a sensitizing agent. However, the recording layer preferably contains at least 50% by weight of the photoconductive polymer having recurring units as described above. Examples of particularly suitable binding agents for use in conjunction with the polymeric substances spectrally sensitized according to the present invention are listed in the main application. Curing agents containing epoxy groups such as the tetraglycidyl ether of tetraphenylene-ethane are particularly suitable.

The photoconductive polymeric compounds having recurring units as described above, which are spectrally sensitized according to the present invention can be used as described in the above U.S. patent application in admixture with known photoconductive substances, e.g. sulphur, selenium, photoconductive oxides, sulphides, and selenides of zinc, cadmium, mercury, antimony, bismuth, and lead. They can be used in combination with organic monomeric photoconductors e.g. anthracene, anthraquinone, polymers containing N-vinylcarbazole recurring units and other known monomeric and polymeric organic photoconductors.

Semi-transparent recording layers can be prepared, in which the polymeric photoconductive compounds having recurring units as described above are used in admixture with (an) inorganic photoconductive substance(s), especially photoconductive substances of the group of zinc oxide, photoconductive lead (II) oxide and photoconductive cadmium sulphide.

These semi-transparent recording layers have a sensitivity to visible light that is markedly greater than that of the transparent recording layer containing only said photoconductive polymers.

Even a very small amount of inorganic photoconductive compound, e.g. 1.5 of photoconductive zinc oxide in respect of 4 g. of poly(1,2-dihydroxy-2,2,4-trimethylquinoline) per sq m. markedly increases the sensitivity of the recording layer to visible light.

In order to prepare an electrophotographic material spectrally sensitized according to the present invention various techniques may be applied.

In practice, the polymeric photoconductors, either alone or together with other additives as described above, preferably are first dissolved or dispersed in a suitable organic solvent such as a ketone, e.g. acetone, chlorinated hydrocarbons, e.g. methylene chloride, and aliphatic esters, e.g. ethyl acetate, or in a mixture of two or more of such solvents. To the solution or dispersion thus formed is then added a solution or dispersion of the spectral sensitizers of use according to the present invention in an organic solvent or mixture of organic solvents that is miscible with or the same as that used for the preparation of the photoconductor composition. It is also possible, of course to disperse or dissolve the spectral sensitizers simultaneously with the polymeric photoconductors and other additives.

The solution or dispersion comprising spectral sensitizer and photoconductor is uniformly spread on a surface of a suitable support, e.g. by centrifuging, spraying, brushing, or coating. Thereupon the layer formed is dried in such a way that a uniform photoconductive layer is formed on the surface of the support.

The optimum quantity of sensitizing agent to be added to the photoconductive composition can be determined by a series of tests. A useful range is comprised between 0.1 and 15 percent by weight relative to the amount of polymeric photoconductor having recurring units as described above.

As described in the U.S. patent application Ser. No. 793,881, the thickness of the photoconductive layers is not critical but is generally comprised between 3 and 10 microns, and the support may be an electroconductive plate or sheet or an insulating plate or sheet covered with an electro-conductive interlayer.

Under electroconductive plate or sheet is understood a plate or sheet whose electrical resistivity is smaller than that of the photoconductive layer i.e. in general smaller than $10^9$ ohm. cm. and preferably is at least 100 times smaller than that of the recording layer. Supports whose resistivity is not higher than $10^7$ ohm. cm. are preferred.

Suitable conductive plates are, e.g., plates of metals such as aluminium, zinc, copper, tin, iron, or lead.

Suitable electro-conductive interlayers for insulating supports are, e.g., vacuum-coated metal layers such as silver or aluminium layers, transparent conductive polymer layers, e.g. applied from polymers containing quaternized nitrogen atoms, such as those described in the United Kingdom patent specification 950,960 or layers containing conductive particles, e.g. carbon black and metal particles dispersed in a binder. The binder used for said particles has a resistivity preferably lower than $10^6$ ohm. cm. A suitable binder for that purpose is gelatin.

It is possible to produce transparent photoconductive recording materials by applying the photoconductive polymers from a clear solution to a conductive transparent base or a transparent insulating base coated with an electro-conductive transparent interlayer.

As transparent bases resin sheets having an optical density of not more than 0.10 are preferred, e.g., a sheet made of polyethylene terephthalate or cellulose triacetate. The conductive interlayer preferably consists of a metal coating, e.g., a vacuum-coated aluminium layer having an optical density of not more than 0.30 or of a conductive transparent polymer layer composed, e.g., of an organic polyionic polymer, e.g. a polymer containing quaternized nitrogen atoms such as a quaternized polyethylene-imine.

In reproduction techniques wherein the prints are to be produced on an opaque background preferably a paper sheet is used as support for the recording layer.

Paper sheets that have an insufficient electrical conductivity are coated or impregnated with substances enhancing their conductivity, e.g. by means of a conductive overcoat such as a metal sheet laminated thereto.

As substances suited for enhancing the conductivity of a paper sheet and which can be applied in the paper mass are particularly mentioned hydroscopic compounds and antistatic agents as described, e.g. in the United Kingdom patent specification 964,877, and antistatic agents of polyionic type, e.g. Calgon Conductive Polymer 261 (registered trademark of Calgon Corporation, Inc., Pittsburgh, Pa., U.S.A.), for a solution containing 39.1% by weight of active conductive solids and which contains a conductive polymer having recurring units of the following type:

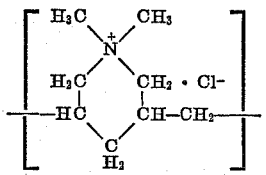

Paper sheets are preferably impermeabilized to organic solvents, e.g. by means of a water-soluble colloid or by strongly hydrating the cellulose fibers such as in the case of glassine paper.

Electrophotographic materials spectrally sensitized according to the present invention can be used in any of the different techniques known in recording with the aid of photoconductors. According to a preferred embodiment they can be used in a technique based on the discharge of an electrostatically charged recording layer by exposure to light. However, these electrophotographic materials can also be used in an electrophotographic recording technique, wherein the image-wise exposure precedes the charging step. Such technique is described in the United Kingdom patent specification 964,872.

Photoconductive recording materials prepared according to the present invention can be used in exposure units equipped with incandescent lamps, so that they need not be exposed with light rays rich in ultraviolet such as those emitted by a high-pressure mercury vapour bulb.

The electrostatic charging of photoconductive recording elements according to the present invention can be effected according to any method known in electrophotography, e.g. by friction with a smooth material, with a material possessing a high electric resistance, e.g. a cylinder coated with polystyrene, by corona discharge, by contact charge, or by discharge of a capacitor.

In order to obtain an electrostatic image, it is possible to effect the charging and exposure steps simultaneously and even to expose image-wise before charging since a conductivity image is formed, which is not immediately destroyed, especially if diazonium salts are used in the recording element.

The conversion of the latent image into a visible image can occur according to one of the techniques known in electrophotography, wherein use is made of the electrostatic attraction or repulsion of finely divided coloured substances, which, e.g. are present in a powder mixture, in an electrically insulating liquid (e.g. in the form of a suspension) or in a gas (e.g. in the form of an aerosol), or wherein electrostatic attraction is used for selectively wetting charged portions of the recording layer as described in the United Kingdom patent specifications 1,020,505 and 1,033,419.

The following example illustrates the present invention.

EXAMPLE

A series of electrophotographic recording materials was prepared as follows.

To a polyethylene terephthalate support of 100µ a conductive transparent coating was applied from an aqueuos solution of gelatin and Calgon Conductive Polymer 261 in a weight ratio of 2:1 (Calgon Conductive Polymer 264 is a registered trademark of Calgon Corporation, Inc., Pittsburgh, Pa., U.S.A. for a solution containing 39.1% by weight of active conductive solids and which contain a conductive polymer having recurring units of the following type:

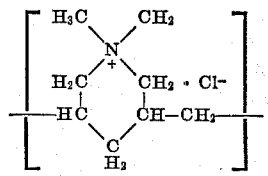

The coating was carried out in such a way that the dried coating contained 2 g. of gelatin per sq. m. The electrical resistivity of the coating was $1 \times 10^6$ ohm per sq. cm.

An electrophotographic recording material was prepared by coating onto said conductive layer a composition containing:

Acetone _____ ccs__ 100
Methylene chloride _____ ccs__ 100
Flectol H (trade name for a low molecular weight (average amount of recurring units being 5) poly (1,2-dihydro-2,2,4-trimethylquinoline) having a specific gravity 1.12 at 25° C. and an intrinsic viscosity [η] 0.04 dl./g. measured in methylene chloride at 25° C., manufactured by Monsanto Chemical Company, St. Louis, Mo., U.S.A.)__g__ 7.5
Silicon Harz UD 160 (trade name) of Farbenfabriken Bayer A. G. Leverkusen, Germany, for an organic Silicon oxide polymeric binding agent) _____g__ 3.75
Sensitizing dye as listed in the table below _____g__ 0.2

The dried layer cotained 3 g. of poly(1,2-dihydro-2,2,4-trimethyl-quinoline) per sq. m.

The electrophotographic materials were negatively charged with a negative corona, having a potential difference of −6000 v. between the corona wires and the ground, and then contact-exposed through a step wedge having 0.20 log exposure increments, by means of a tungsten filament lamp of 15 watt/130 volt having a colour temperature of 2600° K. and placed at a distance of 25 cm.

The latent images were electrophoretically developed by means of an electrophoretic developer obtained by diluting the concentrated developer composition described hereinafter in a volume ratio of 15/1000 by means of Isopar H (trade name for an isoparaffinic hydrocarbon mixture having a boiling range of 177–188° C. sold by Esso Belgium, N.V., Antwerp, Belgium):

Carbon black (average particle size: 20 nm.) __g__ 30
Zinc monotridecyl phosphate as dispersing agent _g__ 1.5
Isopar H (trade name) _____ml__ 750
Resin solution prepared as described hereinafter _g__ 150

The resin binder solution was prepared by heating 500 g. of Alkyldal L 67 (trade name for a linseed oil modified (67% by weight) alkyd resin of Farbenfabriken Bayer A.G., Leverkusen, Germany) and 500 ccs. of white spirit containing 11% by weight of aromatic compounds at 60° C. till a clear solution was obtained, and subsequent cooling.

From the wedge-prints obtained the relative speed values of the developed materials were calculated based on a comparison of the number of visible steps produced in the wedge-prints obtained in the spectrally sensitized materials with the number of visible steps produced in a spectrally unsensitized material to which a relative speed of 100 is given.

The relative speed values are listed in the following table.

TABLE

| Sensitizing dye added | Relative speed value | Sens. max. (mn.) |
| --- | --- | --- |
| None | 100 | <380 |
| 2 | 1,000 | 509 |
| 5 | 1,600 | 510 |
| 6 | 1,600 | 508 |
| 9 | 1,000 | 506 |
| 10 | 400 | 462 |
| 12 | 630 | 504 |
| 15 | 1,000 | 655 |
| 16 | 630 | 655 |
| 18 | 1,000 | 660 |
| 19 | 400 | 640 |
| 20 | 1,600 | 574 |
| 21 | 400 | 575 |

We claim:

1. A photosensitive recording material comprising a photoconductive recording element, which contains a polymeric substance comprising recurring groups corresponding to the following general formula:

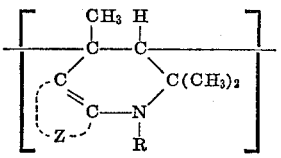

wherein:

R represents hydrogen or a group that can be introduced into a secondary amine by reaction therewith of a compound containing R, and Z represents the necessary atoms to complete an aromatic nucleus, and a dye corresponding to one of the following general formulae:

I.

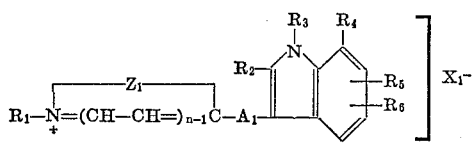

wherein:

$A_1$ stands, for a dimethine or a tetramethine group, $n$ stands for 1 or 2, $R_1$ stands for an alkyl group, an allyl group, an aralkyl group, an aryl group or a cycloalkyl group, $R_2$ stands for an alkyl group, an aryl group or a 5- or 6-membered heterocyclic nucleus the heteroatom of which is oxygen, sulphur, selenium or nitrogen, $R_3$ stands for hydrogen or has one of the meanings given for $R_1$, $R_4$ stands for hydrogen, alkyl, alkoxy or halogen or together with $R_3$ forms an alkylene bridge, or together with $R_5$ represents the atoms necessary to complete a fused-on benzene nucleus, $R_5$ and $R_6$ stand separately for hydrogen, alkyl, alkoxy or halogen or togther represent the atoms necessary to complete a fused-on benzene nucleus, $X_1^-$ stands for an anion, and $Z_1$ represents the atoms necessary to complete a heterocyclic nitrogen-containing nucleus of the types used in the production of cyanine dyes;

II.

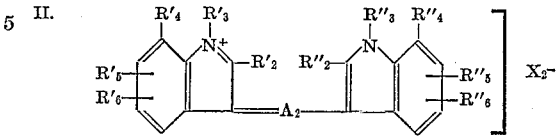

wherein:

$A_2$ stands for a monomethine or a trimethine group, $R'_2$–$R'_6$ and $R''_2$–$R''_6$ have one of the meanings given for $R_2$–$R_6$ and $X_2^-$ stands for an anion.

2. A photosensitive recording material according to claim 1, wherein said dye is present in an amount between 0.1 and 15 percent by weight relative to the amount of polymeric substance.

3. A recording material according to claim 1, wherein the recording layer is applied onto a conductive layer or support having a resistivity at least $10^2$ times smaller than that of the recording element itself.

4. A recording material according to claim 3, wherein the support is a paper support.

5. A recording material according to claim 3, wherein the support is an insulating transparent resin support coated with a transparent electro-conductive interlayer.

6. A recording material according to claim 5, wherein said interlayer contains a polyionic resin.

7. A recording material according to claim 1, wherein the recording element is a recording layer containing particles decreasing the fringe effect.

8. A recording material according to claim 7, wherein the said particles have a grain size of 1 to 5 microns and are present in the recording layer in an amount of 2.4 to 24% by weight in respect of the polymeric material.

9. A recording material according to claim 1, wherein the photoconductive polymer is used in admixture with a polymeric binding agent and/or curing agent.

10. A recording material according to claim 1, wherein the polymeric substance is used in admixture with at least one inorganic or organic photoconductive substance.

11. A recording material according to claim 10, wherein the polymeric substance is used in admixture with a photoconductive compound selected from the group of photoconductive selenium, and the photoconductive oxides, sulphides, and selenides of zinc, cadmium, mercury, antimony, bismuth and lead.

12. A recording material according to claim 1, wherein the polymeric substance is used in admixture with a binding agent and/or a curing agent increasing the photoconductivity of the recording element.

13. A recording material according to claim 1, wherein the polymeric substance is used in admixture with the tetraglycidyl ether of tetraphenylene-ethane.

14. A recording material according to claim 1, wherein the polymeric substance is poly(1,2-dihydro-2,2,4-trimethylquinoline).

15. A recording material according to claim 14, wherein the molecules of said polymeric substance contain at least 5 of said recurring units.

References Cited

UNITED STATES PATENTS

| 3,507,692 | 4/1970 | Ghys et al. | 117—201 |
| 3,560,207 | 2/1971 | Van Lare | 96—1.6 |
| 3,560,208 | 2/1971 | Fumia et al. | 96—1.6 |

GEORGE F. LESMES, Primary Examiner

M. WITTENBERG, Assistant Examiner

U.S. Cl. X.R.

96—1.5; 260—240, 319.1

UNITED STATES PATENT OFFICE
CERTIFICATE OF CORRECTION

Patent No. 3,684,505    Dated August 15, 1972

Inventor(s) Vanheertum et al

It is certified that error appears in the above-identified patent and that said Letters Patent are hereby corrected as shown below:

In the heading of the Patent, insert --

Assignee:  Agfa-Gevaert, Mortsel, Belgium -- .

Signed and sealed this 8th day of May 1973.

(SEAL)
Attest:

EDWARD M.FLETCHER,JR.          ROBERT GOTTSCHALK
Attesting Officer              Commissioner of Patents